United States Patent [19]

Anarwala

[11] Patent Number: 4,469,353

[45] Date of Patent: Sep. 4, 1984

[54] FORGERY-DETERRENT DOCUMENT LAMINATION

[75] Inventor: Mushtaq Anarwala, Chicago, Ill.

[73] Assignee: Sealtran Corporation, Chicago, Ill.

[21] Appl. No.: 367,258

[22] Filed: Apr. 12, 1982

[51] Int. Cl.[3] .......................... G09F 3/00; B32B 7/04; B32B 3/00; B32B 33/00

[52] U.S. Cl. .......................... 283/74

[58] Field of Search .......................... 283/100, 106, 107, 108, 283/110, 112, 74; 428/155, 916

[56] References Cited

U.S. PATENT DOCUMENTS

| | | | |
|---|---|---|---|
| Re. 25,005 | 7/1961 | Hannon | 283/108 |
| B 480,591 | 3/1976 | Bildusas | 283/107 |
| 2,588,067 | 3/1952 | Whitehead | 283/108 |
| 3,376,661 | 4/1968 | Hulett | 283/110 |
| 3,417,497 | 12/1968 | Hannon | 283/108 |
| 3,983,645 | 10/1976 | Rycroft | 283/108 |
| 4,070,774 | 1/1978 | Staats et al. | 283/108 |
| 4,183,554 | 1/1980 | Howard, Jr. | 283/112 |
| 4,298,217 | 11/1981 | Muraw et al. | 283/108 |

*Primary Examiner*—Robert L. Spruill
*Assistant Examiner*—Paul M. Heyrana, Sr.
*Attorney, Agent, or Firm*—Kinzer, Plyer, Dorn & McEachran

[57] ABSTRACT

A protective lamination film for an identification card or other document, of the kind comprising a tough, abrasion-resistant transparent polyester film coated with polyethylene or other adhesive activatable by heat and pressure, has a multiplicity of slits cut into the film in a pattern that allows the film to hold together in normal use but causes the film to tear if any post-lamination alteration is attempted; the film may be employed as an outer cover for the document, or it may comprise separate film interposed between the document and a continuous film providing an external cover.

14 Claims, 7 Drawing Figures

Fig. 1.
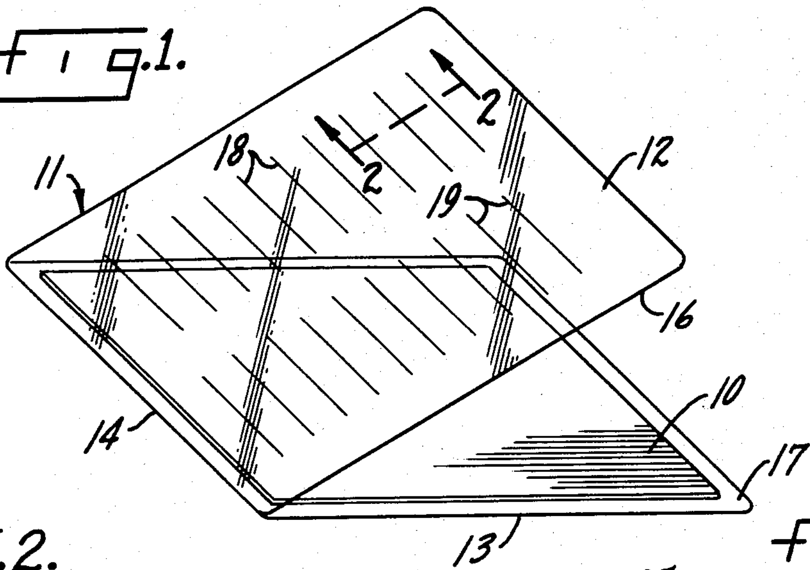
Fig. 2.
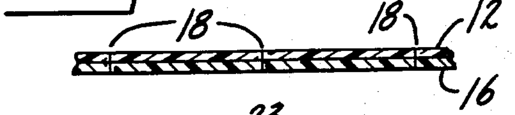
Fig. 5.
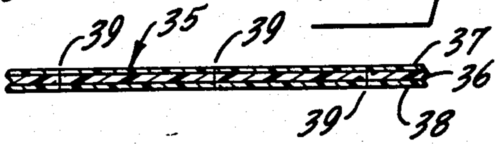
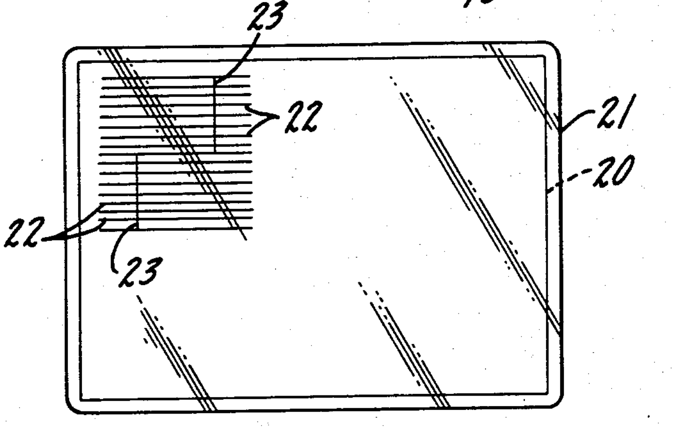
Fig. 3.
Fig. 6.
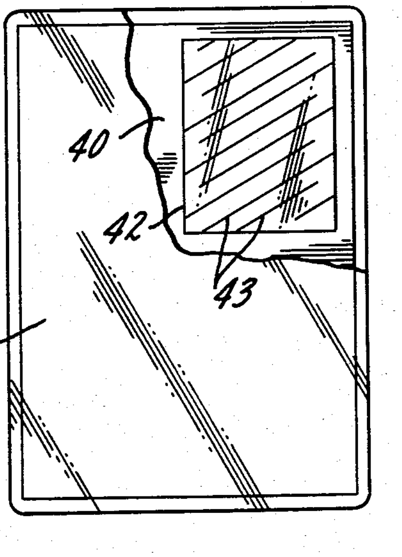
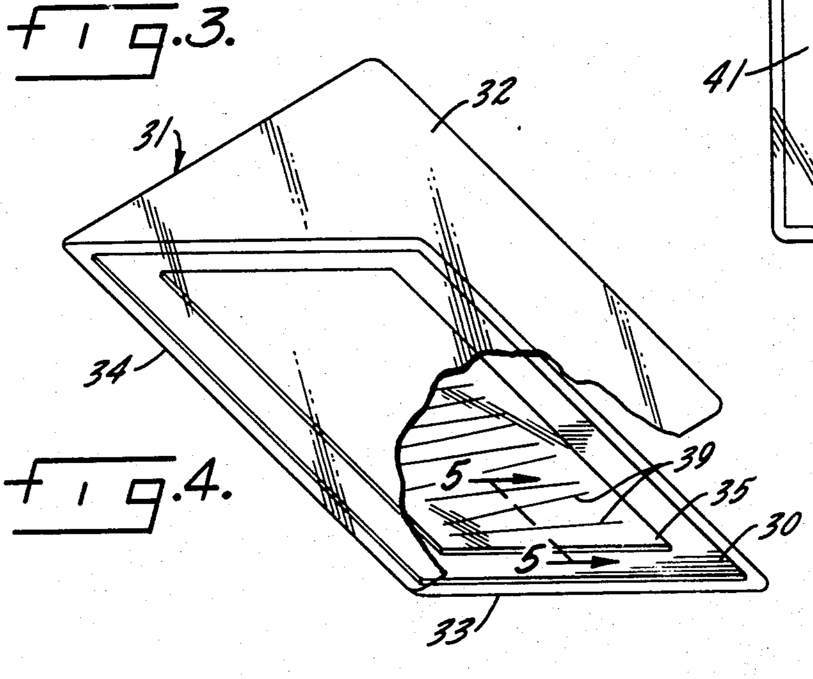
Fig. 4.
Fig. 7.
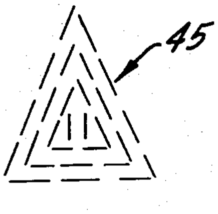

FORGERY-DETERRENT DOCUMENT LAMINATION

BACKGROUND OF THE INVENTION

A wide variety of identification cards have become a common feature of our society; they include drivers licenses, credit cards, student identification cards, membership identification cards for clubs and other organizations, and numerous others. The base stock for the identification card may be paper; thin sheets of various resins may also be employed. The identification material may be applied to the card by printing, typewriting, handwriting (signatures) or any combination of methods. A small photograph is often included in the composite identification card. Strips of magnetizable material bearing magnetic indicia are also in common use.

Many of these identification cards are protected by heat sealed transparent resin covers. The most common type of covering material is a film of a hard, tough, abrasion-resistant bi-axially oriented polyester; the most frequently used material of this kind is a polyethylene terephthalate film available under the commercial designation Mylar. The inner surface of the polyester film has a coating of polyethylene or other material constituting an adhesive activatable by heat and pressure. To form a protective sealed cover for an identification card, the card is placed between two sheets of this composite film, with the polyethylene coatings facing each other and facing the document itself. The resulting "sandwich" is subjected to heat and pressure to fuse the cover films to the document and to each other. The result is an encapsulated identification card that can withstand long wear and substantial abuse.

Unfortunately, normal wear and even abusive use are not the only possible vicissitudes to which an identification card may be subject. Thus, an identification card coming into the possession of someone other than the rightful owner may be subject to a more sophisticated attack for the purpose of changing a signature, substituting a new photograph, or other alteration. Although the sealed, laminated structure conventionally used, as described above, provided substantial resistance to an attack of this nature, a skillful person can remove a part of the cover film and substitute a critical portion of the identification card, subsequently re-sealing the protective cover over the substitution in a manner that will pass any but the most painstaking of inspections.

SUMMARY OF THE INVENTION

It is a principal object of the present invention, therefore, to provide a new and improved protective lamination film, for protecting an identification card or other document, that is substantially more effective in preventing forgery by substitution than is the case with a conventional heat sealed laminar cover.

The key feature of the present invention is the provision of a multiplicity of slits in a protective lamination for an identification card or other document, in a predetermined pattern covering at least a preselected area of the lamination film sufficient to cover a critical portion of the document, such that the slits allow the lamination to hold together in normal use but cause tearing if post-lamination alteration is attempted.

A further object of the invention is to provide a new and improved forgery deterrent protective lamination for an identification card or other document that uses base materials readily available in the art and that requires no specialized processing, yet affords superior protection against substitutional forgery.

Accordingly, in one aspect the invention relates to a forgery-deterrent protective lamination for an identification card or other document. The lamination comprises a transparent film of tough, abrasion resistant polyester resin having one surface coated with a layer of adhesive, activatable by heat and pressure to laminate the film to the document, and having a multiplicity of slits extending through the polyester film and the adhesive in a predetermined pattern covering at least a preselected area of the film sufficient to cover a critical portion of the document.

In another aspect, the invention relates to a sealed, forgery-deterrent identification card construction comprising an identification card bearing critical identification data on one surface thereof. A first transparent film of tough, abrasion resistant polyester having one surface coated with an adhesive activatable by heat and pressure and having a multiplicity of slits extending through the film in a predetermined pattern is provided, together with a second transparent film of tough, abrasion resistant polyester coated with a heat and pressure activatable adhesive. The identification card is disposed between the two films with the slit pattern of the first film covering at least a part of the critical identification data and the films and card are all laminated together under heat and pressure to form a unitary structure.

BRIEF DESCRIPTION OF THE DRAWINGS

FIG. 1 is a perspective view of an identification card and a protective cover lamination for that card, constructed in accordance with one embodiment of the present invention, at an intermediate stage of assembly;

FIG. 2 is a detail sectional view on a greatly enlarged scale, taken approximately as indicated by line 2—2 in FIG. 1;

FIG. 3 is a plan view of an identification card assembly incorporating a forgery deterrent protective lamination cover constructed in accordance with another embodiment of the present invention, shown just prior to heat and pressure lamination;

FIG. 4 is a perspective view, similar to FIG. 1, illustrating another embodiment of the present invention;

FIG. 5 is a detail sectional view, on a greatly enlarged scale, taken approximately as indicated by line 5—5 in FIG. 4;

FIG. 6 is a plan view of a completed identification card assembly incorporating a forgery deterrent protective lamination constructed in accordance with another embodiment of the present invention, with a portion of the cover cut away to reveal an internal protective lamination; and FIG. 7 illustrates another slit pattern that may be used in implementing the present invention.

DESCRIPTION OF THE PREFERRED EMBODIMENTS

FIG. 1 illustrates an intermediate stage in the application of a sealed, laminated transparent protective cover 11 to an identification card 10. Card 10 may comprise a drivers license, a student identification card, a credit card, a club membership card, or virtually any other form of identification document. The surfaces of card 10 may bear printed data, typewritten data, handwritten data such as a signature, or any other form of identification information. A photograph may be inset into the identification card 10 or may be adherred to one surface of the card. All of these varying combinations of uses and structures are in common conventional use.

FIG. 1 shows the protective cover 11 at an intermediate stage in the process of application of that cover to the identification card 10. In many respects, cover 11 is of conventional construction. Thus, cover 11 is preferably formed of a thin transparent film of hard, tough, abrasion-resistant, biaxially oriented polyester resin such as polyethylene terephthalate. The polyester film forms the outer surfaces 12 and 13 of cover 11, which comprises two sheets joined together along a fold line 14.

The inner surfaces 16 and 17 of cover 11 constitute coatings of a thermoplastic adhesive, applied to the polyester film forming the outer surfaces 12 and 13 of the cover. Typically, the coating constituting surfaces 16 and 17 is polyethylene, though other thermoplastic resins may be employed.

The upper sheet of cover 11 has a multiplicity of slits 18 and 19 formed in it. Slits 18 and 19 are shown arranged in two predetermined patterns of parallel lines, with the two patterns conjointly extending throughout essentially the entire surface area of the cover. The lower or bottom portion of cover 11 may have a similar pattern of multiple slits formed in it. On the other hand, if the critical information requiring substitution for a successful forgery is limited to the upper surface of identification card 10, there is no particular need to form slits comparable to slits 18 and 19 in the bottom part of cover 11.

The slits 18 and 19 extend through both the tough polyester resin constituting the outer surface layer 12 of cover 11 and through the inner adhesive coating 16, as shown in FIG. 2.

To complete the sealing of identification card 10, FIG. 1, the upper sheet of cover 11 is brought down into contact with the top surface of the identification card. The resulting three layer "sandwich" is then passed through a lamination press that applies both heat and pressure throughout the surface area of cover 11. The heat and pressure soften the polyethylene adhesive surfaces 16 and 17 and bond those cover surfaces to the opposed surfaces of identification card 10. If cover 11 is slightly larger than the identification card, as shown in FIG. 1, the rim portion around the identification card has the polyethylene surfaces 16 and 17 bonded to each other. The laminating press may be entirely conventional; many forms of this kind of press are commercially available.

It is the slits 18 and 19 that distinguish cover 11 from previously known protective covers for identification cards or other documents. When lamination of the composite structure shown in FIG. 1 is completed, the slits are essentially invisible. They do not interfere with reading of any of the identification data carried by card 10. However, in the event of any attempt to alter identification data on the upper surface of card 10, slits 18 and 19 cause the overlying portions of cover 11 to tear in a manner such that they cannot subsequently be re-joined with the same degree of matching, blending invisibility as in the original unaltered card structure. Thus, once an alteration involving an attempted removal of any appreciable portion of the upper layer of cover 11 occurs, the surface of the cover is virtually impossible to restore to its original condition, so that the forgery attempt is much more readily detectible than if cover 11 did not include slits 18 and 19.

FIG. 3 illustrates another form of the invention that is generally similar to the construction described above in connection with FIGS. 1 and 2. It shows an identification card 20 enclosed in a cover 21. As before, cover 21 is formed of a film of tough, bi-axially oriented polyester resin constituting the outer surface of the cover. The inner surface again comprises a coating of a heat activatable adhesive resin such as polyethylene. In this instance, cover 21 is provided with a multiplicity of slits 22 extending generally parallel to the long dimension of card 20 instead of being aligned with the short dimension of the card as in FIG. 1. Moreover, the pattern of slits in the card shown in FIG. 3 includes transverse slits 23. In the construction shown in FIG. 3, it may also be noted that the overall pattern formed by slits 22 and 23 is limited to only a minor portion of the surface area of laminating cover 21 instead of covering essentially the entire surface as in the embodiment of FIG. 1.

When the composite card and cover structure shown in FIG. 3 is subsequently subjected to heat and pressure to laminate the cover to the card, the pattern of slits 22 and 23 essentially disappears. Thus, the slits do not interfere with the legibility of any identification data, photograph, or other material on the underlying card 20. Nevertheless, in the event of any attempt to alter that portion of the card that lies beneath the area of slits 22 and 23, the slits cause separation and tearing of the cover material and effectively preclude re-sealing the cover to the card in a manner that would prevent effective detection of the forgery attempt.

FIGS. 4 and 5 illustrate an embodiment of the invention that uses a standard, unaltered film cover. Thus, FIG. 4 shows an identification card 30 disposed within a cover 31 of the conventional pouch type, cover 31 including an upper sheet 32 joined to a lower sheet 33 along a fold line 34. The entire cover 31 is formed of a film of tough, abrasion resistant polyester film with the internal surfaces of the cover coated with a heat activatable adhesive resin such as polyethylene. In this instance, however, there are no slits cut into any portion of the cover.

The embodiment of FIG. 4 further comprises an additional protective lamination 35 that is disposed on the upper surface of card 30 in position to be sealed between the cover sheet 32 and the card. The protective lamination 35 is of composite structure, as shown by the detailed sectional view of FIG. 5. It constitutes a central transparent film 36 of a tough, hard, polyester resin, with two layers of heat activatable adhesive resin 37 and 38 on its opposed surfaces. Moreover, the protective lamination 35 has a multiplicity of slits 39 cut into it, with each of the slits extending completely through the three layers 36–38. As shown in FIG. 4, slits 39 are not parallel to each other and they are not parallel to any edge of lamination 35 or card 30. However, slits 39 are distributed throughout a preselected area of the lamination film sufficient to cover a critical portion of the identification card or other document 30.

To complete the identification card assembly shown in FIG. 4, the upper sheet 32 of cover 31 is folded down against the top surface of the protective lamination 35. The composite identification card and cover structure is then processed, as before, in a laminating press that applies heat and pressure throughout the surface area. The adhesive layer 37 on the top of lamination sheet 35 is fused to the corresponding layer of adhesive material on the bottom of cover sheet 32. The polyethylene or other adhesive resin film 38 on the bottom of lamination sheet 35 is fused to the top surface of identification card 30. The bottom surface of the identification card becomes fused to the adhesive resin on the inner surface of cover sheet 33. If the identification card 30 is smaller than cover 31, as shown, the edge portions of the two cover sheets 32 and 33 are fused and sealed to each other through the medium of their inner adhesive coatings.

The forgery deterrent function of the embodiment of FIGS. 4 and 5 is essentially the same as for the protective card structures described above. The slits 39 are essentially invisible when the complete card structure and cover has been heat and pressure laminated. However, any attempt to alter the material on the upper surface of identification card 30 leads almost inevitably to separation and tearing of lamination sheet 35, due to the presence of slits 39, and it is extremely difficult if not impossible to re-seal the lamination sheet in such a way that the alteration attempt will not be apparent.

FIG. 6 illustrates yet another embodiment of the invention as applied to an identification dard 40. Card 40 has been sealed in a cover 41 of conventional construction. In this instance, an additional protective lamination 42 has been interposed between card 40 and cover 41, with the supplemental protective lamination 42 covering only a minor portion of one surface of card 40. Typically, this might be the portion of card 40 bearing a photograph or a signature.

The supplemental protective lamination 42 has the same construction as the larger lamination 35 of FIGS. 4 and 5, so that it can be effectively sealed to both card 40 and cover 41. Lamination 42 is provided with a multiplicity of slits 43 that extend completely through the lamination, as in all previous embodiments. In this instance, the slits 43 extend out to the edges of the protective lamination.

The final step of heat and pressure lamination in the completion of the protected card shown in FIG. 6 is the same as for the previous embodiments. Moreover, the protective lamination 42 functions in the same manner as described before, with the slits 43 being essentially invisible following lamination of the card but providing a clear indication of any attempt at subsequent alteration.

FIG. 7 illustrates another slit pattern 45 that can be used in any of the previously described embodiments of the invention. If the slit pattern is applied to a limited area of an external card cover, as in FIG. 3, the pattern 45 can be located in any portion of the cover that requires special protection, such as an area overlying a photograph. For a separate small insert such as the protective lamination 42 of FIG. 6, an arrangement like pattern 45 may cover most of the surface area of the lamination. Of course, pattern 45 may be repeated if a larger area requires protection. From this and the other foregoing examples, it will be apparent that a wide variety of arrangements can be utilized for the pattern of slits in the protective lamination.

I claim:

1. A forgery-deterrent protective lamination for an identification card or other document comprising a transparent film of tough, abrasion resistant polyester resin having one surface coated with a layer of adhesive, activatable by heat and pressure to laminate the film to the document, and having a multiplicity of thin, essentially invisible slits extending through the polyester film and the adhesive in a predetermined pattern covering at least a preselected area of the film sufficient to cover a critical portion of the document, the slits remaining essentially invisible when the protective lamination is bonded to a document under heat and pressure but being revealed upon attempted post-lamination tampering.

2. A forgery-deterrent protective document lamination, according to claim 1, in which the lamination has a surface area and configuration sufficient to cover one complete surface of the document.

3. A forgery-deterrent protective document lamination, according to claim 2, in which the pattern of slits extends throughout substantially the entire surface area of the lamination.

4. A forgery-deterrent protective document lamination, according to claim 2, in which the pattern of slits is limited to only a minor portion of the surface area of the lamination.

5. A forgery-deterrent protective document lamination, according to claim 1, or claim 2, or claim 3, or claim 4, in which the forgery-deterrent protective lamination constitutes an outer cover for the document.

6. A forgery-deterrent protective document lamination, according to claim 5, in which the forgery-deterrent protective lamination is joined to a second composite protective lamination film along a fold line to afford a pouch laminatable to the opposite sides of the document to protect both document surfaces.

7. A forgery-deterrent protective document lamination cover, according to claim 6, in which the second protective lamination also has a multiplicity of slits extending through it, in at least a preselected area, for forgery deterrence.

8. A forgery-deterrent protective document lamination, according to claim 1, or claim 2, or claim 3, or claim 4, in which the polyester resin film of the forgery-deterrent protective lamination has both surfaces coated with adhesive activatable by heat and pressure so that the lamination is adapted to use as an intermediate layer sealed between the document and an outer protective cover.

9. A forgery-deterrent protective document lamination, according to claim 1, in which the protective lamination is substantially smaller than the document, and in which the polyester resin film of the forgery-deterrent protective lamination has both surfaces coated with adhesive activatable by heat and pressure so that the lamination is adapted to use as an intermediate layer sealed between the document and an outer protective cover.

10. A sealed, forgery-deterrent identification card construction comprising:

- an identification card bearing critical identification data on one surface thereof;
- a first transparent film of tough, abrasion resistant polyester having one surface coated with an adhesive activatable by heat and pressure and having a multiplicity of thin, essentially invisible slits extending through the film in a predetermined pattern;
- a second transparent film of tough, abrasion resistant polyester coated with a heat and pressure activatable adhesive;
- the identification card being disposed between the two films with the slit pattern of the first film covering at least a part of the critical identification data and the films and card laminated together under heat and pressure to form a unitary structure, the slits remaining essentially invisible when the protective lamination is bonded to a document under heat and pressure but being revealed upon attempted post-lamination tampering.

11. A sealed, forgery-deterrent identification card construction according to claim 10 in which the first and second films each cover an entire surface of the card.

12. A sealed, forgery-deterrent identification card construction according to claim 11 in which the pattern of slits extends throughout substantially the entire surface area of the first film.

13. A sealed, forgery-deterrent identification card construction according to claim 11 in which the pattern of slits is limited to a minor portion of the surface area of the first film.

14. A sealed, forgery-deterrent identification card construction according to claim 10, in which the first film is coated with adhesive on both sides, and further comprising a third film of tough, abrasion resistant polyester film coated with a heat and pressure activatable resin, overlying and laminated to the first film.

* * * * *